United States Patent [19]

Fujiwara et al.

[11] Patent Number: 4,617,952

[45] Date of Patent: Oct. 21, 1986

[54] SWITCHING VALVE AND AN ELECTRO-PNEUMATIC PRESSURE CONVERTER UTILIZING THE SAME

[75] Inventors: Masatoshi Fujiwara, Yokosuka; Masato Kuroda, Fujisawa, both of Japan

[73] Assignee: Yamatake-Honeywell Co. Limited, Tokyo, Japan

[21] Appl. No.: 756,198

[22] Filed: Jul. 18, 1985

[30] Foreign Application Priority Data

Jul. 31, 1984 [JP] Japan .......................... 59-116031[U]
May 10, 1985 [JP] Japan ................................ 60-98063

[51] Int. Cl.$^4$ ........................................... F16K 31/02
[52] U.S. Cl. ................................ 137/85; 137/596.17; 137/625.65; 251/129.06
[58] Field of Search ................... 251/129.06; 137/102, 137/625.65, 596.17, 85

[56] References Cited

U.S. PATENT DOCUMENTS

| | | | |
|---|---|---|---|
| 2,928,409 | 3/1960 | Johnson et al. ........................ | 137/82 |
| 4,340,083 | 7/1982 | Cummins ................... | 251/129.06 X |
| 4,492,360 | 1/1985 | Lee et al. ....................... | 251/129.06 |
| 4,535,810 | 8/1985 | Duder et al. ................... | 137/596.17 |

Primary Examiner—Gerald A. Michalsky
Attorney, Agent, or Firm—Mitchell J. Halista; Trevor B. Joike

[57] ABSTRACT

A switching valve has at least one plate-shaped piezo-electric element having a free end which is supported in a sealed chamber, at least two fluid directing nozzles arranged to be opened or closed due to the position of the free end of the piezo-electric element and a fluid output passage communicating outwardly from said sealed chamber. An electric-pressure converter uses the switching valve, a pilot relay for converting a fluid pressure signal delivered from the output passage into a standard air pressure signal, a pressure sensor for converting the pressure signal from said pilot relay into an electrical signal, pulse-width modulating means for providing a pulse-width modulated signal, which corresponds to the deviation between the electrical signal from the pressure sensor and an external reference electric signal, for energizing the plate-shaped piezo-electric element in the switching valve.

5 Claims, 8 Drawing Figures ated air pressure signal, a pressure sensor for converting the pressure signal from said means for converting into an electrical signal, pulse-width modulating means for providing a pulse-width modulated signal, which corresponds to the deviation between the electrical signal from the pressure sensor and an external reference electric signal for energizing the plate-shaped electric current deformable element in the switching valve.

SWITCHING VALVE AND AN ELECTRO-PNEUMATIC PRESSURE CONVERTER UTILIZING THE SAME

BACKGROUND OF THE INVENTION

1. Field of the Invention

This invention relates to valves. More specifically, the present invention is directed to a switching valve for controlling the direction of flow of fluids by the use of piezo-electric elements as actuators and to an electro-pneumatic pressure converter utilizing the switching valve for process control and other applications.

2. Description of the Prior Art

Electromagnetic valves utilizing an electrically energized solenoid coil have been used conventionally for controlling the direction of flow of fluids such as air, water, etc. However, in systems where high speed switching was required in spite of low fluid flow rates, means other than the above described electromagnetic switching valves were not generally available for attaining required high switching speeds. Although the electromagnetic valves did realize smooth, accurate and speedy control of fluids, they had an inherent problem of relatively high electric driving power consumption. Particularly in cases where the flow rates were relatively low and the switching frequencies were relatively low at 10 to 20 Hz, the driving power was still relatively large, making high power consumption a serious drawback.

Since fluid switching operations must be carried out at relatively high speeds in devices using pulse modulation for controlling the flow and pressure of fluids, the need for a simple switching valve other than the above described electromagnetic valve has been felt for a long time.

In conventional electro-pneumatic pressure converters, electrical input signals were converted into fluid pressure signals by converting the electrical signals into a fluid nozzle back pressure. In one such device, a piezo-electric element was used on a nozzle flapper, and the nozzle flapper installed to face a nozzle opening was moved in response to the input signal to change the gap between the nozzle opening and the flapper to regulate the nozzle back pressure. In another such device, the gap between the nozzle flapper and the nozzle opening was not controlled but instead the nozzle flapper was arranged to oscillate near the oscillation frequency, and the ratio between the full nozzle open and full nozzle closed time during one cycle was regulated in response to the input signal. However, in both the above devices a serious drawback was that sufficient gain could not be obtained for the input signal while converting the electrical input signal into nozzle back pressure.

SUMMARY OF THE INVENTION

It is an object of the present invention to provide an improved switching valve characterized by a simple operation and structure.

It is another object of this invention to provide an improved electro-pneumatic pressure converter for converting electric signals into fluid pressure signals.

In accomplishing these and other objects, there has been provided, in accordance with the present invention, a switching valve having a sealed chamber, at least one plate-shaped electric current deformable element means having at least one free end which is supported in the sealed chamber, at least two fluid directing nozzles to be opened or closed due to the position of the free end of the piezo-electric element and a fluid output passage communicating outwardly from the sealed chamber. An electric-pressure converter uses the switching valve, a means for converting a fluid pressure signal delivered from the output passage into a regulated air pressure signal, a pressure sensor for converting the pressure signal from said means for converting into an electrical signal, pulse-width modulating means for providing a pulse-width modulated signal, which corresponds to the deviation between the electrical signal from the pressure sensor and an external reference electric signal for energizing the plate-shaped electric current deformable element in the switching valve.

BRIEF DESCRIPTION OF THE DRAWINGS

A better understanding of the present invention may be had when the following description is read in connection with the accompanying drawings, in which.

DECRIPTION OF THE PREFERRED EMBODIMENT

Figure 1:
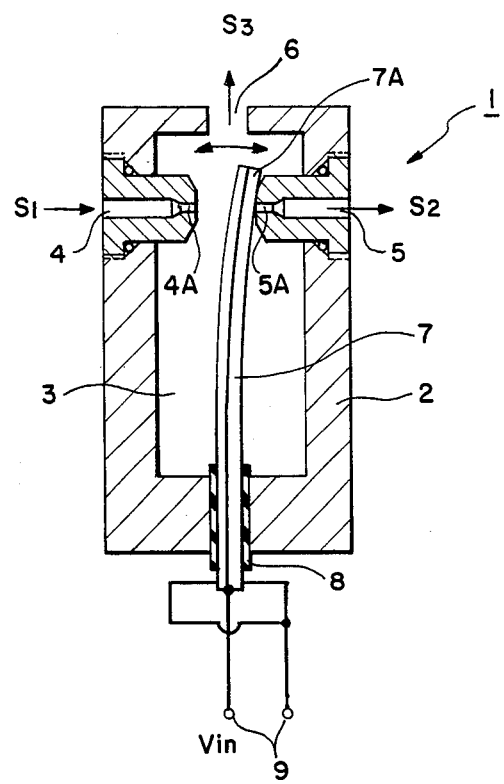
FIG. 1 is a cross-sectional illustration of an example of an embodiment of the switching valve of the current invention.

Referring to FIG. 1, there is shown a cross-sectional illustration of a switching valve 1 having a sealed chamber 3 in a valve body 2. Fluid directing nozzles 4A and 5A are located on the opposite sides of the chamber 3 and open into the sealed chamber 3. The nozzles 4A, 5A are located at the end of first and the second fluid passages 4 and 5, respectively. A third fluid passage 6 is located in one end of the sealed chamber 3. Fluid paths S1, S2 and S3 are, respectively, first fluid inlet side, second fluid outlet side and a fluid output side and are connected to respective one of the passages 4, 5 and 6. A plate shaped bimorph piezo-electric element 7 is installed so that a free end 7A of the element 7 is supported inside sealed chamber 3 of the valve body 2 whereby the movement of the end 7A of the element 7 controls the effective opening of nozzles 4A and 5A. An electrically insulating seal 8 is provided around the fixed end of the main body of the bimorph piezo-electric element 7 to electrically isolate the element 7 from the valve body 2. Input terminals 9 are connected to the element 7 for applying a driving voltage Vin to the bimorph piezo-electric element 7 to energize the element 7.

In the valve device of the above described construction, either the first or the second fluid path, that is either nozzle 4A or 5A, is closed, while the other one is open, when the end 7A, which may include valve seats (not shown) facing nozzles 4A,5A, is moved in the desired direction by applying a corresponding electric voltage to terminals 9. Therefore, passages 4 and 5 are selectively connected to the output passage 6 to allow the direction of flow or the resulting pressure to be switched. Bimorph piezo-electric element 7 described above is formed from plates obtained by building up layers of piezo-electric material. An electrode layer is formed on each outer face of the material of the plates. By applying required level of electric current across the electrode layers, a free end of element 7 can be moved by a bending of the layers. The piezo-electric element 7 can be made of quartz, single crystal materials, ceramics such as barium titanate, titanic acid-zincronic acid lead, lead titanate, etc., or organic piezo-electric materials such as polyvinylidene fluoride. Such materials produce an electric current when an external pressure is applied and can also be used as actuators as they produce a motion to apply pressure when an electric voltage is applied thereacross. Using a bimorph piezo-electric element 7, as above described as a means of switching fluid paths, has enabled the valve to achieve high switching speeds due to quick response characteristics and low power consumption. Therefore, the structure of the device of the current invention allows one of the two inlet passages 4 or 5 to be connected to outlet passage 6 by driving the moving end 7A of the piezo-electric element 7. This structure assures simple, accurate and fast fluid path switching even for relatively low flow rates and at the same time reduces power consumption.

Figure 2:
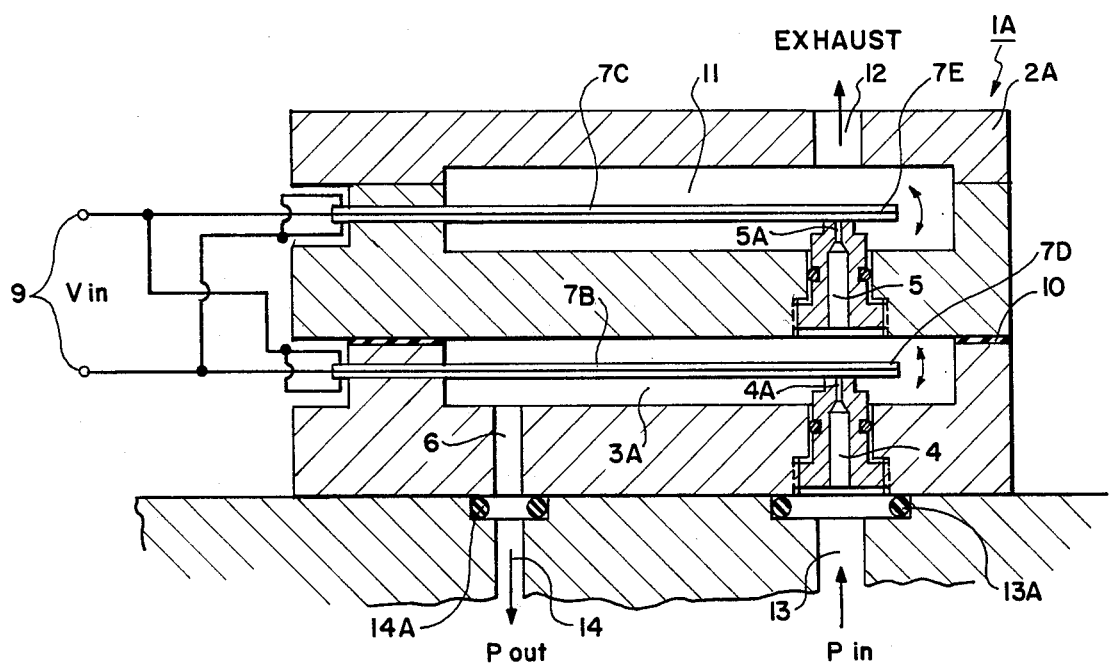
FIGS. 2, 3 and 4 are cross-sectional and perspective illustrations of other embodiments of the switching valve of the current invention.

FIG. 2 shows another example of an embodiment of the device of the current invention. Referring to FIG. 2, the first fluid path, that is fluid passage 4, is connected between the nozzle 4A located inside sealed chamber 3A formed in valve body 2A and a fluid supply (not shown). A chamber 11 is formed inside a valve body 2A parallel to the sealed chamber 3A. The sealed chamber 3A is connected to chamber 11 via a second fluid path 5A to which a nozzle 5A is connected. Now, bimorph piezo-electric elements 7B and 7C are installed in chambers 3 and 11, respectively, and are designed to open and close nozzles 4A and 5A, respectively, by corresponding free ends 7D,7E. A gasket 10 is used to seal the sealed chamber 3 while passage 12 connects the chamber 11 to the atmosphere. A pressurized air supply path 13 is used to apply a pressurized supply (not shown) to the first path, that is path 4, 14 is a pressure output (P out) path for routing a pressurized fluid from sealed chamber 3. O-rings 13A, 14A are used to seal the joints between the valve body and fixed sections. In a device of above described configuration, the pair of bimorph piezo-electric elements 7B and 7C are disposed in such a way that their movable ends 7D and 7E move in opposite directions with an electrical energization so that when one of the nozzles 4A or 4B is closed the other is open. This allows the valve to change the direction of flow of the fluid. The sealed chamber 3 also acts as a volume chamber to assure uniform output pressure.

Figure 3:
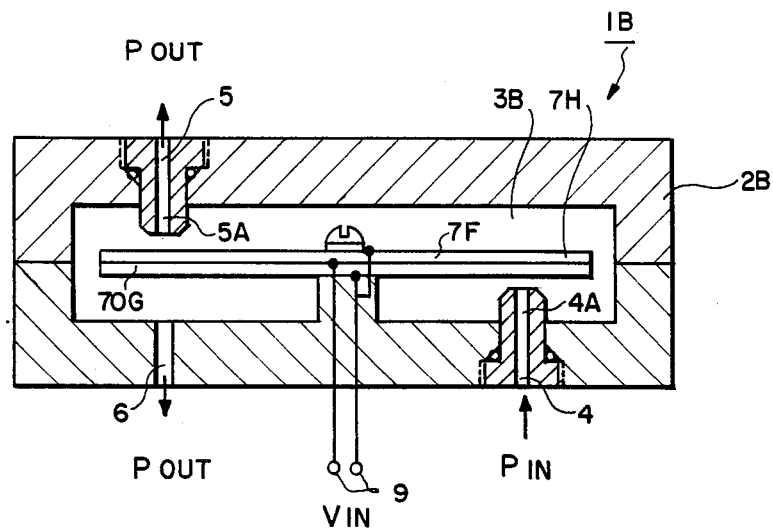
Figure 4:
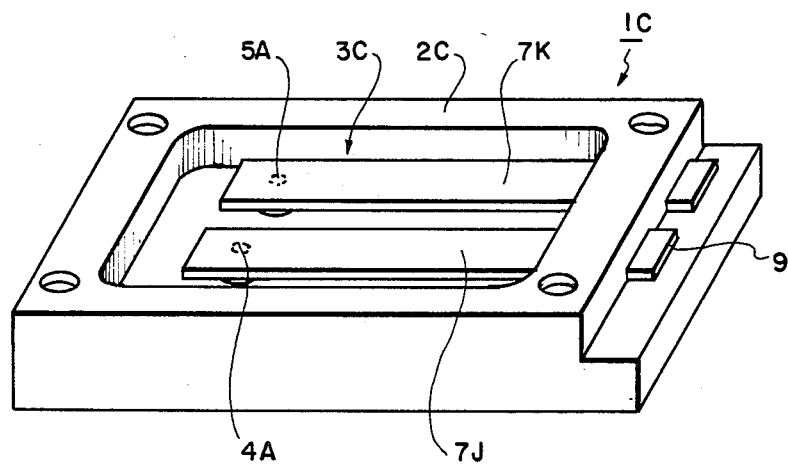

Referring to FIG. 3, the center of bimorph piezo-electric element 7F may be supported in sealed chamber 3B and the movable ends 7G and 7H made to face injection nozzles 4A and 5A extending from opposite sides of the chamber 3B to realize control of the direction of fluid flow just as in the above described embodiment. In this case, the movable ends 7G and 7H of the bimorph piezo-electric element 7F will bend in the same direction when an electric current is applied to terminals 9. It is quite clear, therefore, that this bending movement will cause one of the nozzles 4A or 5A to be closed while the other to be opened. Similarly, referring to FIG. 4, a pair of bimorph piezo-electric elements 7J and 7K may be installed in parallel in the same direction and made to move in mutually opposite directions.

The embodiments described above refer to a device in which bimorph piezo-electric elements are used to control (open/close) nozzles 4A and 5A. However, the applications are not restricted to the above described embodiments, and similar results can also be obtained by the use of other electric current deformable elements, e.g., electrostrictive elements.

Figure 5:
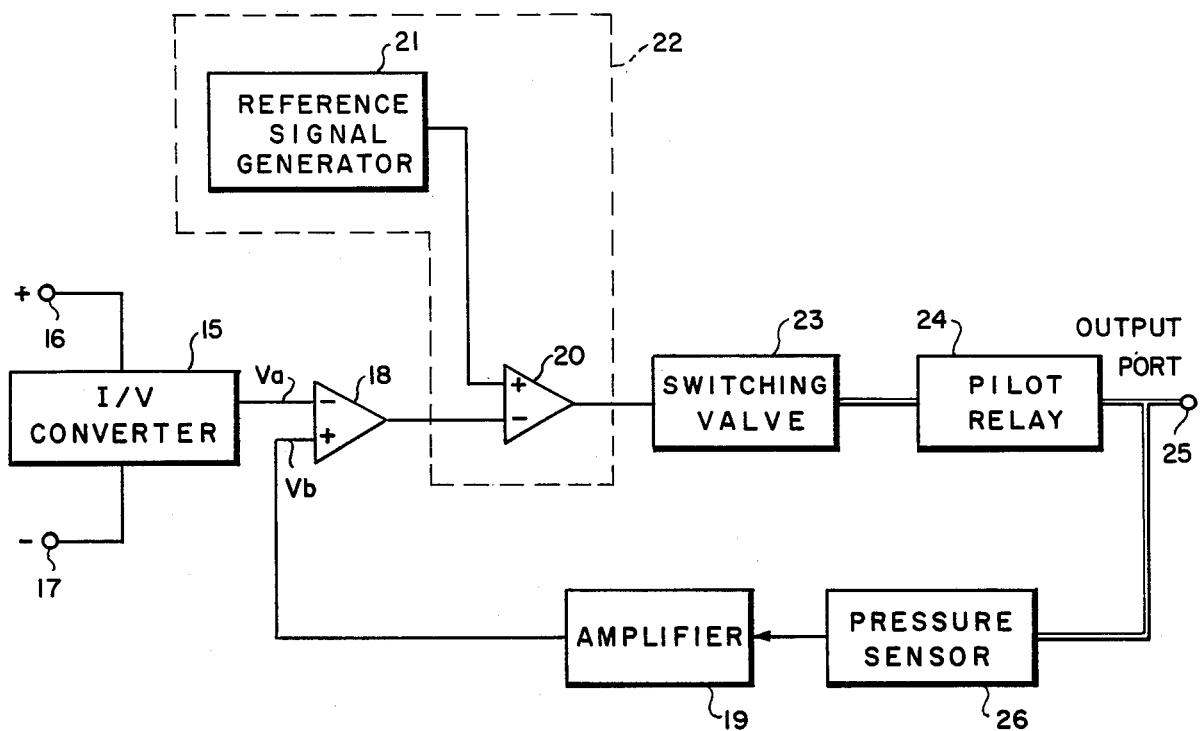
FIG. 5 is a block diagram of an example of an embodiment of an electro-pneumatic converter using the switching valve shown in FIGS. 1 to 4.
Figure 6:
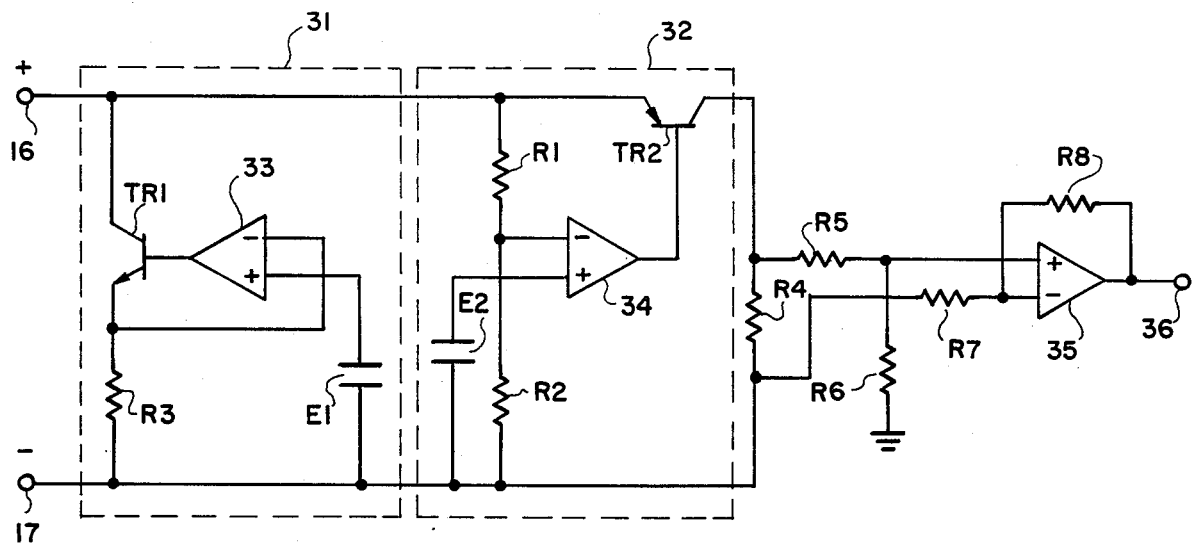
FIG. 6 is a circuit diagram of an example of the current-to-voltage converter shown in FIG. 5.

FIG. 5 illustrates a block diagram of an example of an electro-pneumatic pressure converter based on the above described switching valve. Referring to FIG. 5, an input I/V converter circuit 15 converts a current signal, e.g., 20 mA, applied through input terminals 16 and 17 into a voltage signal and at the same time provides the power to other circuits in the device. FIG. 6 illustrates the input circuit 15 in detail. As shown in FIG. 6, the input circuit 15 is configured from an operational amplifier 33, a transistor TR1, a resistor R3, and a constant voltage power supply E1. A constant voltage circuit 32 is configured from an operational amplifier 34, a transistor TR2, resistors R1 and R2 and a constant voltage power supply E2. An output circuit includes an operational amplifier 35, R4 to R8 resistors R4, R5, R6, R7 and R8 and an output terminal 36.

Operational amplifier 18 outputs a deviation voltage signal obtained by comparing the input signal Va from input circuit 15 with the feedback signal Vb applied from a means of a feedback amplifier 19 to the negative (−) terminal of comparator 20. The output signal line from reference signal generator circuit 21, designed to generate a stable square wave signal, is applied to the positive (+) terminal of the comparator 20. The comparator 20 and reference wave generation circuit 21 form a pulse width modulation means 22.

Figure 7:
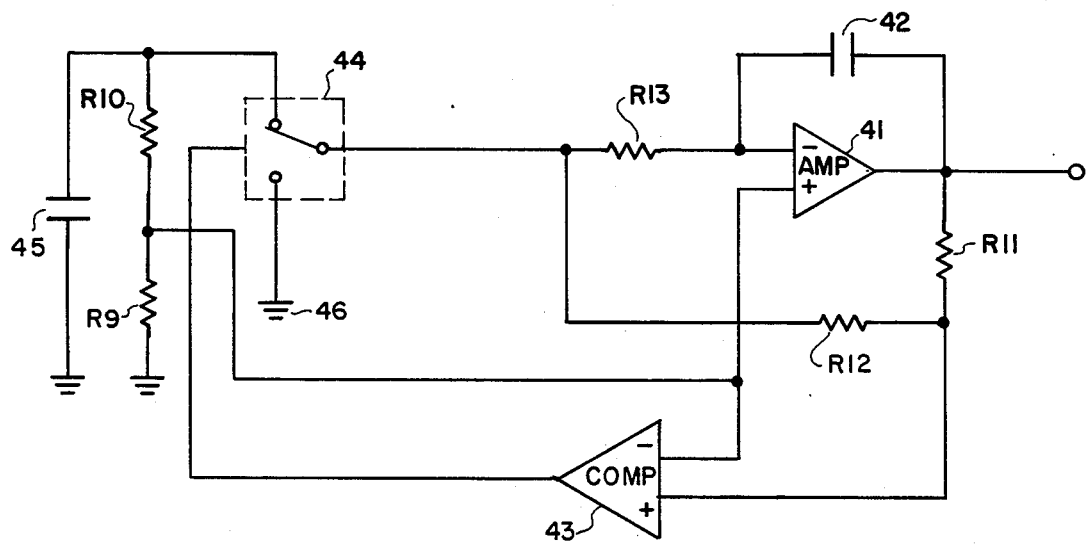
FIG. 7 is a circuit diagram of an example of the reference signal generator circuit shown in FIG. 5.

As described above, reference signal generation circuit 21 generates a stable square wave signal. FIG. 7 is a detailed schematic of said circuit. Referring to this figure, an operational amplifier 41 forms an AND circuit with comparator 43. Referring to the same figure, R9, R10, R11 and R12 are resistors configuring a signal dividing and distributing circuit. Switch 44 is controlled by an output from operational amplifier 43. When the output signal from the amplifier 43 is inverted, the connection between a reference voltage source 45 and a common terminal 46 is reversed. This configuration has been employed to assure a square wave of superior cycle and oscillation stability.

Referring to FIG. 5, switching valve 23 applies air pressure Po to pilot relay 24. Pilot relay 24 provides a means of immediately amplifying and coverting the applied air pressure signal into a reference air pressure signal. An output from pilot relay 24 is routed to output port 25. This becomes the reference air pressure to which an external pressure is to be regulated. The output of pilot relay 24 is also routed to a pressure sensor 26. Pressure sensor 26 provides a means of converting an air pressure signal into an electric signal. The resulting electric signal is amplified by amplifier 19 and is applied to the positive terminal of driving amplifier 18.

Figure 8:
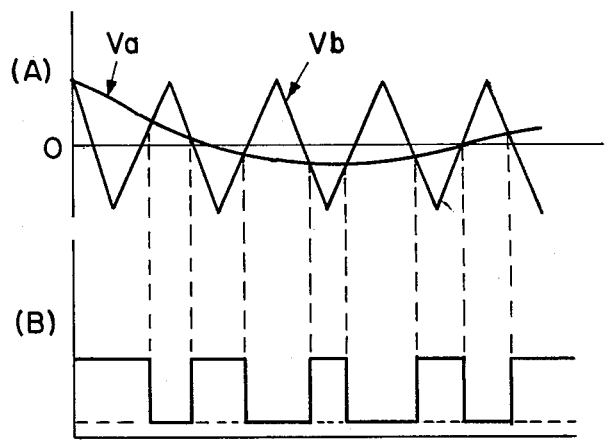
FIG. 8 is a waveshape diagram showing the signal waveforms of the operation of the device shown in FIG. 5.

Operation of a device described in the above embodiment shall be described next and includes reference to FIG. 1 which illustrates a switching valve. When a current signal varying between 4 to 20 mA is applied to terminals 16 and 17, it is converted into a voltage signal Va by the input circuit 15. This signal Va is compared with the output signal Vb from the amplifier 19, which is an electric signal obtained from the output air pressure. This means that the driving amplifier 18 outputs the differential between the two signals, that is (Va-Vb). FIG. 8 (a) illustrates the waveform deviation signal (Va-Vb) output from the driving amplifier 18.

This deviation signal (Va-Vb) is applied to comparator 20 and is compared with the square wave reference signal (Waveform b in FIG. 8) generated by reference signal generator circuit 21. If the reference signal is greater than the deviation signal (Va-Vb), comparator 20 goes HIGH (ON) and goes LOW (OFF) if it is smaller. This means that a pulse width modulated signal, as shown in FIG. 8 (b), is obtained as a comparator 20 output signal. The comparator 20 output pulse ratio becomes 1:1 in the vicinity of the zero point. Condition HIGH is held longer when the deviation signal (Va-Vb) is positive. Condition LOW continues longer when the deviation signal (Va-Vb) is negative.

In switching valve 23, the nozzle 4 is open when the comparator 20 output pulse is HIGH and at this point nozzle 5 is closed routing the applied air pressure from nozzle 4 to sealed chamber 3 by turning on switching valve 23. On the other hand, when comparator output pulse 20 goes LOW, nozzle 4 closes, nozzle 5 opens and the air pressure from nozzle 4 is shut out from sealed chamber 3 by closing switching valve 23.

Therefore, when an ON/OFF signal, as shown in FIG. 8 (b) is applied from comparator 20, the pressure in sealed chamber 3 varies between the pressures from the nozzles 4,5, and the output pressure Po at air pressure output passage 6 also varies. This means that the duration of the ON status as compared to the OFF status of switching valve 23 becomes longer when the deviation signal (Va-Vb) is positive. Since the pressure from nozzle 4 is arranged to be higher than the pressure from nozzle 5, the pressure Po output from pressurized air passage 6 increases. On the other hand, when the deviation signal (Va-Vb) is negative, the duration of OFF status becomes longer, and the output pressure Po is lowered. Sealed chamber 3 also acts as volume chamber to smooth out the output air pressure Po.

This pressurized output air pressure Po is detected by the pressure sensor 26 and is converted into an electrical signal which is fed back to the driving amplifier 18 via the amplifier 19. This feedback signal acts to reduce the deviation signal (Va-Vb) to zero. Thus, the feedback control operation assures a stable air pressure Po is response to the input signal on the input terminals 16,17.

The switching valve device of the current invention described above and characterized by at least one plate shaped bimorph piezo-electric element or an electrostrictive element supported on one end inside a sealed chamber, at least two injection nozzles controlled (open/close) by a movement of a free end of the piezo-electric element and an output passage from the interior of the sealed chamber is not only simple in structure and economical, but is capable of realizing simple and accurate control of fluid flow while simultaneously speeding up the control operation and at the same time has succeeded in reducing power consumption by the use of piezo-electric elements and particularly improved the operation efficiency when the fluid flow rate is relatively low, making it suitable for a wide variety of applications.

The electric-pneumatic converter described in the current invention enables a control of the pressurized air output Po of a switching valve by using plate shaped piezo-electric elements to control valve pressure injection nozzles whereby the output pressure Po can be varied, and the electric to pneumatic conversion gain can be increased considerably as compared to a conversion method used in back pressure system.

Accordingly, it may be seen that there has been provided, in accordance with the present invention, an improved switching valve and an improved electro-pneumatic converter utilizing the same.

The embodiments of the present invention in which an exclusive property or privilege is claimed are defined as follows:

1. An electric-pressure converter comprising
   a sealed chamber,
   a switching valve having at least one plate-shaped electric current deformable element mean having at least one free end which is supported in said sealed chamber,
   at least two pressure injection nozzles arranged to be opened or closed due to a position of said free end of said element means, and
   an output passage communicating outwardly from said sealed chamber,
   means for converting the air pressure signal routed from said output passage into a regulated air pressure signal,
   a pressure sensor for converting the pressure signal from said means for converting into an electrical signal,
   pulse-width modulating means for providing a pulse-width modulating signal which corresponds to the deviation between the electrical signal from said pressure sensor and
   an external electric reference signal for energizing said plate-shaped electric current deformable element means in said switching valve.

2. A converter as set forth in claim 1 wherein said element means includes electric terminals for connecting to a voltage supply for applying an energizing voltage across said element.

3. A converter as set forth in claim 1 wherein said element means includes a first piezo-electric element having a free end associated with a first one of said nozzles and a second piezo-electric element associated with a second one of said nozzles.

4. A converter as set forth in claim 3 wherein said element means includes electric terminals for connecting to a voltage supply for concurrently applying an energizing voltage across said first and second piezo-electric elements.

5. A converter as set forth in claim 1 wherein said element means includes a piezo-electric element centrally supported and having a first free end associated with a first one of said nozzles and a second free end associated with a second one of said nozzles.

* * * * *